United States Patent
Yasukawa et al.

(10) Patent No.: US 7,023,170 B2
(45) Date of Patent: Apr. 4, 2006

(54) ORIGIN OFFSET CALCULATION METHOD OF ROTATIONAL POSITION DETECTING DEVICE OF ELECTRIC MOTOR AND MOTOR CONTROL DEVICE USING THE CALCULATION METHOD

(75) Inventors: Kouichi Yasukawa, Hyogo (JP); Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/177,594

(22) Filed: Jul. 11, 2005

(65) Prior Publication Data

US 2006/0012328 A1 Jan. 19, 2006

(30) Foreign Application Priority Data

Jul. 15, 2004 (JP) .............................. 2004-208953

(51) Int. Cl.
*H02P 5/28* (2006.01)
(52) U.S. Cl. ...................... 318/799; 318/800; 318/705; 318/809
(58) Field of Classification Search ................ 318/705, 318/706, 710, 716, 719, 799, 800, 802–810
See application file for complete search history.

(56) References Cited

U.S. PATENT DOCUMENTS

| 5,390,102 | A | * | 2/1995 | Araki | ........................... 363/71 |
|---|---|---|---|---|---|
| 6,025,691 | A | * | 2/2000 | Kawabata et al. | .......... 318/700 |
| 6,628,099 | B1 | * | 9/2003 | Iwaji et al. | .................. 318/700 |
| 6,639,377 | B1 | * | 10/2003 | Iwaji et al. | .................. 318/700 |
| 6,737,828 | B1 | * | 5/2004 | Kiuchi et al. | ................ 318/779 |
| 6,815,924 | B1 | * | 11/2004 | Iura et al. | .................... 318/727 |
| 6,940,250 | B1 | * | 9/2005 | Nishimura et al. | ......... 318/705 |
| 2005/0093519 | A1 | * | 5/2005 | Nakayama et al. | ........... 322/27 |
| 2005/0104551 | A1 | * | 5/2005 | Nishimura et al. | ......... 318/719 |

FOREIGN PATENT DOCUMENTS

JP 2004-266935 A 9/2004

* cited by examiner

Primary Examiner—Paul Ip
(74) Attorney, Agent, or Firm—Sughrue Mion, PLLC (57) ABSTRACT

An inverter that executes a d q-axis control of a three-phase synchronous motor needs a rotational position sensor that detects rotational positions of an electric motor for mutual conversion between two-phase and three-phase. An angle error of this rotational position sensor affects accuracy in the d q-axis control, so that it is necessary to make a compensation with accuracy. In the conventional method, however, there is a problem of occurrence of an ignorable error due to influence of noise. An origin offset calculation method according to the invention includes a first process of forcibly making d q-axis current command values zero; a second process of multiplying a magnetic flux component voltage command value at this time by a proportional integral gain; and a third process of storing a rotational position sensor phase error when a magnetic flux component voltage command value becomes zero being a result of the second process.

10 Claims, 5 Drawing Sheets

ORIGIN OFFSET CALCULATION METHOD OF ROTATIONAL POSITION DETECTING DEVICE OF ELECTRIC MOTOR AND MOTOR CONTROL DEVICE USING THE CALCULATION METHOD

BACKGROUND OF THE INVENTION

1. Field of the Invention

The present invention relates to a method of calculating a phase difference (offset) between a rotor reference position of an electric motor and an origin of a rotational position-detecting device resulted from, e.g., the fact that the rotational position-detecting device mounted on the electric motor is located out of position, and to a motor control device using such calculation method.

2. Description of the Related Art

There is a conventional motor control device that supplies (in both directions) an electric power from a power supply (hereinafter, referred to as inverter) capable of controlling a frequency and voltage, current, and phase to an AC motor (hereinafter, described as a synchronous motor here) thereby controlling a torque or a rotational speed thereof.

In this conventional motor control device, it is necessary to control phases of, e.g., voltage to be supplied based on rotational angles of an electric motor, so that a rotational position detecting device capable of outputting a rotational angle of a rotor of the electric motor as an instantaneous data is mounted on the electric motor. However, many rotational position detecting devices are mounted somewhat out of a real origin position of a rotor, so that it is necessary to compensate rotational angle signals having been detected, and to use them.

Although a variety of compensation methods have been proposed, what is important is that a phase difference between a rotor reference position and an origin of the rotational position detecting device is calculated and compensated. In this sense, for example, the Japanese Patent Application No. 054472/2003 has proposed a method.

The principle of calculation of a phase difference between a rotor reference position of an electric motor and an origin of a rotational position detecting device resulted from, e.g., the fact that the rotational position detecting device, which is mounted on the electric motor, is located out of position as is disclosed in the Japanese Patent Application No. 054472/2003, is now described on the supposition that the motor is a three-phase synchronous motor.

Letting a direction of the magnetic flux of a rotor d-axis, and a direction orthogonal to a magnetic flux of the rotor q-axis (it is also referred to as a control axis), voltage equations of d-axis and q-axis components, in the case where a phase difference between a rotor reference position and an origin of a rotational position detecting device is zero, will be expressed as follows.

$$V_d = R i_d - \omega \phi_q \quad (1)$$

$$V_q = R i_q + \omega \phi_d \quad (2)$$

:where $V_d$ is a d-axis voltage, $V_q$ is a q-axis voltage, and R is a resistance of one phase; $i_d$ is a d-axis current, $i_q$ is a q-axis current, and $\phi_d$ is a d-axis component magnetic flux; and $\phi_q$ is a q-axis component magnetic flux, and $\omega$ is an angular velocity of a rotor.

When $i_d=0$ and $i_q=0$ in the above equation, $\phi_d$ and $\phi_q$ will be expressed as follows:

$$\phi_d = L_d i_d + \phi_f = \phi_f \quad (3)$$

$$\phi_q = L_q i_q = 0 \quad (4)$$

:where $L_d$ is a d-axis inductance, $L_q$ is a q-axis inductance, and $\phi_f$ is a magnetic flux of a rotor.

Voltage equations of d-axis, q-axis components at this time will be expressed as follows:

$$V_d = 0 \quad (5)$$

$$V_q = \omega \phi_f \quad (6)$$

Thus, Vd is zero.

However, in the case where there is a phase difference $\eta$ between a rotor reference position and a detection output from a rotational position detecting device, currents $i_d$, $i_q$ of an electric motor will be transformed to $i_d'$, $i_q'$ will be expressed as follows:

$$i_d' = i_d \cos \eta - i_q \sin \eta \quad (7)$$

$$i_q' = i_d \sin \eta + i_q \cos \eta \quad (8)$$

Voltage equations of d'-axis, q'-axis components at this time will be expressed as follows:

$$V_d' = R i_d' - \omega \phi_q \cos \eta + \omega \phi_d \sin \eta \quad (9)$$

$$V_q' = R i_q' + \omega \phi_q \sin \eta + \omega \phi_d \cos \eta \quad (10)$$

At this time, even if $i_d'=0$, and $i_q'=0$, $$V_d' = \omega \phi_f \sin \eta \quad (11)$$

$$V_q' = \omega \phi_f \cos \eta \quad (12)$$

Thus, $V_d'$ is not zero.

At this time, it becomes necessary to calculate such an origin offset that $V_d$ is zero. As for such calculation method, there are the followings:

(1) The method of sequentially adding an arithmetical progression (1°, 2°, ... n°) to an output from the above-mentioned rotational position detecting device as a phase compensation amount when a d-axis voltage command value is not zero, and continuing the addition until a d-axis voltage command value comes to be zero.

(2) The method of calculating an arc tangent of a d-axis voltage command value and a q-axis voltage command value, and adding this arc tangent to an output from the above-mentioned rotational position-detecting device as an origin offset.

(3) The method of scanning at regular intervals of a predetermined angle from 1° to 180° as phase compensation amounts to record d-axis voltage command values when the above-mentioned d-axis voltage command value is not zero, and then making the interpolation from two phase compensation amounts the above-mentioned d-axis voltage command values of which are close to zero to calculate an origin offset.

However, in the case of intending to calculate an origin offset from a magnetic flux component voltage command value according to the above-described conventional art, since it is the determination based on instantaneous values, current values of the above-mentioned magnetic flux component and a component orthogonal to this component are not constant due to influence of, e.g., higher harmonic components of voltage or noise. Accordingly, there are some cases where current values of a magnetic flux component and a component orthogonal to this component are not zero even if voltage command values of a magnetic flux component are zero. Thus, a problem exists in the decrease of calculation accuracy of an origin offset.

Furthermore, in the case where there is any detection error in a current detector, the detection error is outputted even if an actual current value is zero. Thus, values obtained by the coordinate transformation of these detection outputs are not constant values, but values that periodically fluctuate. Even if any control is made to cause these values to be zero, voltage command values are not zero but values that periodically fluctuate. Thus, a problem exists in the decrease of calculation accuracy of an origin offset.

Moreover, current values or voltage command values after the coordinate transformation fluctuate due to the change in rotation. Thus, a problem exists in the decrease of calculation accuracy of an origin offset.

In other words, a problem exists in that high calculation accuracy cannot be obtained by the conventional calculation method of an origin offset.

SUMMARY OF THE INVENTION

An object of the present invention is to provide a calculation method of an origin offset, which is unlikely to be affected by higher harmonics of voltage or noise, detection error of a current detector, or change in rotation of an electric motor, and which improves calculation accuracy.

Another object of the invention is to provide a motor control device equipped with an origin offset calculation device of a rotational position-detecting device using the above-mentioned calculation method.

An origin offset calculation method of a rotational position detecting device of an electric motor according to the invention is used in a motor control device that includes:
- a current detector that detects a three-phase current of a three-phase synchronous motor;
- a rotational position detecting device that detects a rotational position of the mentioned three-phase synchronous motor;
- a three-phase to two-phase converter that makes coordinate transformation of the mentioned three-phase current into a magnetic flux component and an orthogonal component orthogonal to the mentioned magnetic flux component based on the mentioned rotational position;
- a current command generator that divide a current command value, which is provided from outside, into a current command value of the mentioned magnetic flux component and a current command value of the mentioned orthogonal component;
- a current control operator that operates voltage command values of mentioned each component so that a current value of the mentioned magnetic flux component and a current value of the mentioned orthogonal component are equal to command values of the mentioned each component of the mentioned current command generator respectively;
- a two-phase to three-phase converter that makes the coordinate transformation of a voltage command value of the mentioned each component into a three-phase voltage command value; and
- an inverter that outputs a voltage to be applied to the mentioned three-phase synchronous motor based on an output from the mentioned two-phase to three-phase converter; and the origin offset calculation method of a rotational position detecting device of an electric motor comprises:
- a first process of forcibly making a current command value of the mentioned each component zero;
- a second process of controlling offset to make the addition to an output from the mentioned rotational position detecting device so that the mentioned magnetic flux component voltage command value is zero by multiplying a deviation between the mentioned magnetic flux component voltage command value and zero by a predetermined proportional integral gain when the mentioned current command value becomes zero;
- a third process of letting the mentioned offset when the mentioned magnetic flux component voltage command value becomes zero a phase-difference between the mentioned rotor reference position and an origin of the mentioned rotational position detecting device, and of storing this phase difference as an origin offset; and
- a fourth process of adding the mentioned origin offset to an output from the mentioned rotational position detecting device.

Further, a motor control device according to the invention comprises:
- a current detector that detects a three-phase current of a three-phase synchronous motor;
- a rotational position detecting device that detects a rotational position of the mentioned three-phase synchronous motor;
- a three-phase to two-phase converter that makes the coordinate transformation of the mentioned three-phase current into a magnetic flux component and an orthogonal component orthogonal to the mentioned magnetic flux component based on the mentioned rotational position;
- a current command generator that divide a current command value, which is provided from outside, into a current command value of the mentioned magnetic flux component and a current command value of the mentioned orthogonal component;
- a current control operator that operates voltage command values of the mentioned each component so that current values of the mentioned each component are equal to command values of the mentioned each component of the mentioned current command generator respectively;
- a two-phase to three-phase converter that makes the coordinate transformation of a voltage command value of the mentioned each component into a three-phase voltage command value;
- an inverter that outputs a voltage to be applied to the mentioned three-phase synchronous motor based on an output from the mentioned two-phase to three-phase converter
- a zero input circuit that forcibly makes a current command value of the mentioned each component of control coordinate system zero in the mentioned control state;
- a proportional integral phase compensation amount operator that controls offset to make addition to an output from the mentioned rotational position detecting device so that the mentioned magnetic flux component voltage command value is zero by multiplying a deviation between mentioned magnetic flux component voltage command value and zero by a predetermined proportional integral gain when mentioned current command value becomes zero;
- a storage circuit that lets the mentioned offset when the mentioned magnetic flux component voltage command value becomes zero a phase difference between the mentioned rotor reference position and an origin of the mentioned rotational position detecting device, and stores this phase difference as an origin offset; and a compensation circuit that adds the mentioned origin offset to an output from the mentioned rotational position detecting device.

According to the origin offset calculation method of the invention, a phase compensation amount initial value is calculated from a voltage command value of a component orthogonal to a magnetic flux component when a current command value becomes zero; a proportional integral phase compensation amount when magnetic flux component voltage command values are changed over time and then converged by control of multiplying a deviation between a magnetic flux component voltage command value and zero by a proportional integral gain so that a magnetic flux component voltage command value may be zero; a phase compensation amount is obtained by addition of the mentioned phase compensation amount initial value and the mentioned proportional integral phase compensation amount; and a phase difference between a rotor reference position and an origin of a rotational position detecting device resulted from, e.g., the fact that a rotational position detecting device of an electric motor is mounted out of position. Phase compensation amounts are scanned in a predetermined scanning range from an origin offset between a rotor reference position and a rotational position detecting device by calculating a phase compensation amount initial value from a voltage command value of a component orthogonal to a magnetic flux component, and adding this phase compensation amount initial value to a proportional integral phase compensation amount. As a result, there is no erroneous detection of another phase compensation amount with which a voltage command value of a magnetic flux component becomes zero at the time of making zero a current command value of each component of the mentioned control coordinate system that is inverted 180° from an origin offset.

Furthermore, it is confirmed that detected current values of the above-mentioned each component and a voltage command value of a magnetic flux component remain in a predetermined range, and an average value of phase compensation amounts in the case where the detected current values of the mentioned each component and a voltage command value of a magnetic flux component are in a predetermined range, is taken as an origin offset. As a result, this origin offset calculation method is unlikely to be affected, e.g., by higher harmonics of voltage or noise, detection error of a current detector, or change in rotation of an electric motor, thereby enabling to achieve improvement in detection accuracy of an origin offset.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
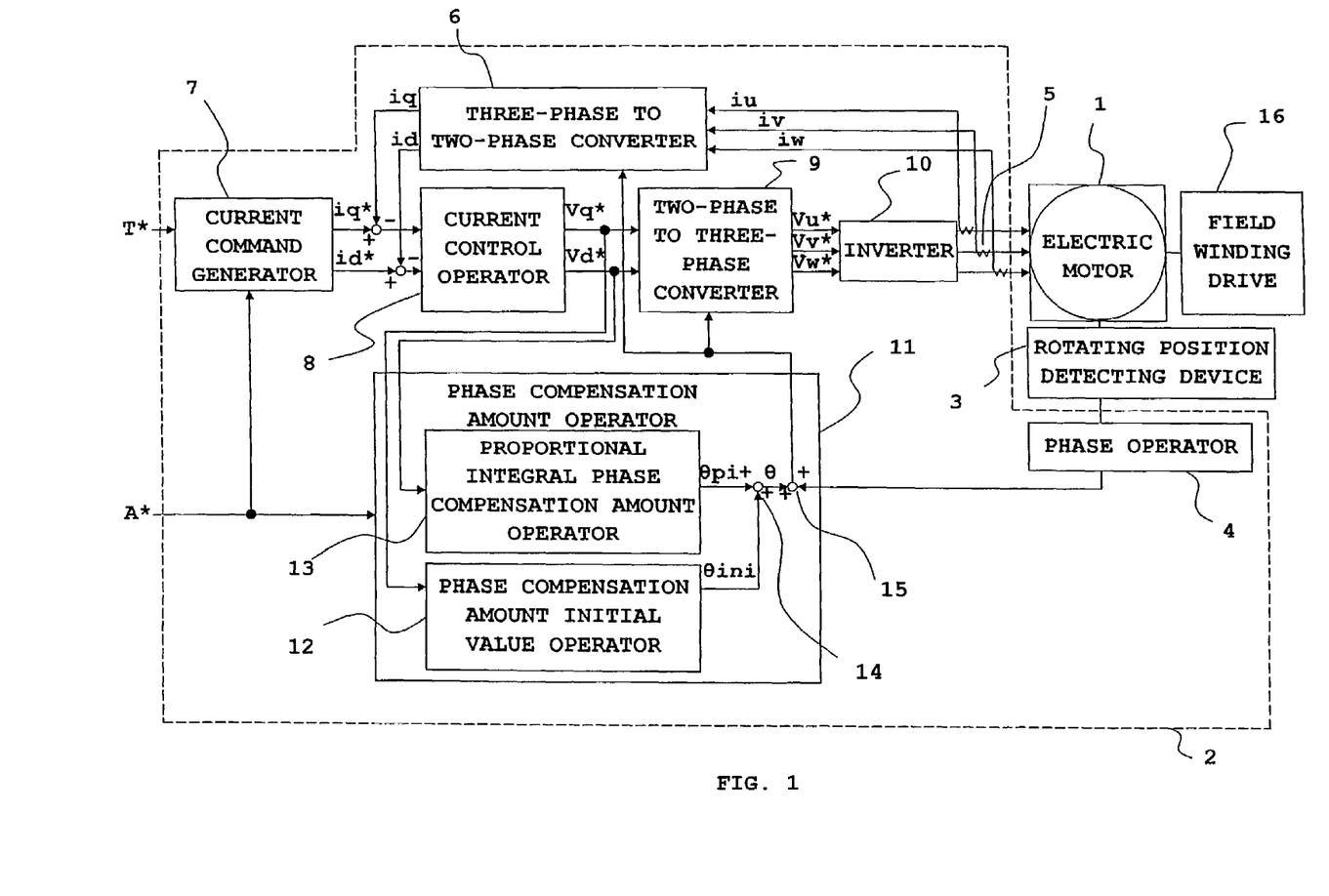
FIG. 1 is a block diagram of a control device of an electric motor according to a first preferred embodiment of the present invention.

FIG. 1 is a block diagram of the entire motor control system including a motor control device for explaining an origin offset calculation method according to a first preferred embodiment of the present invention.

Figure 2:
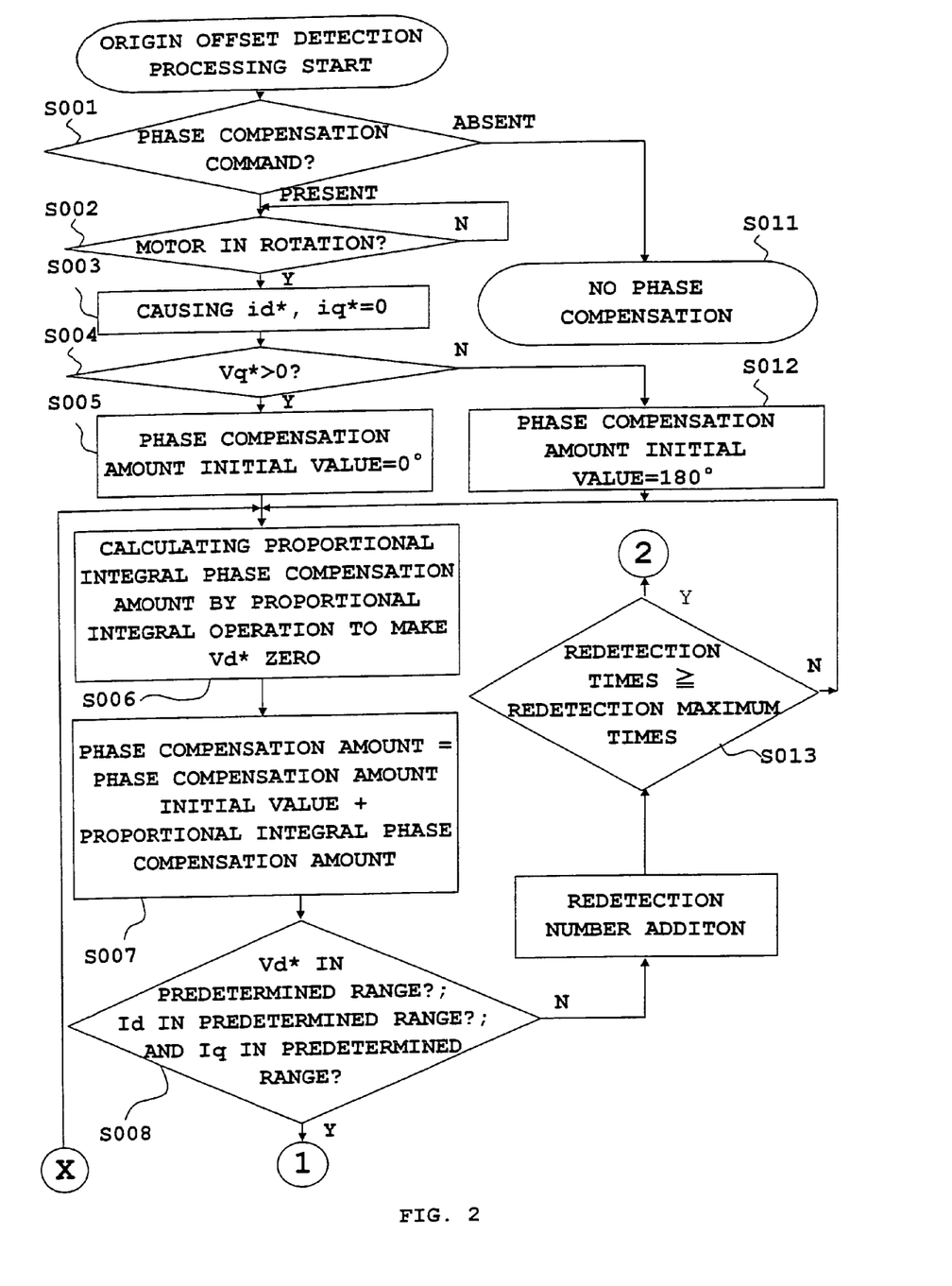
FIG. 2 is a flowchart explaining a phase compensation detection method of FIG. 1.
Figure 3:
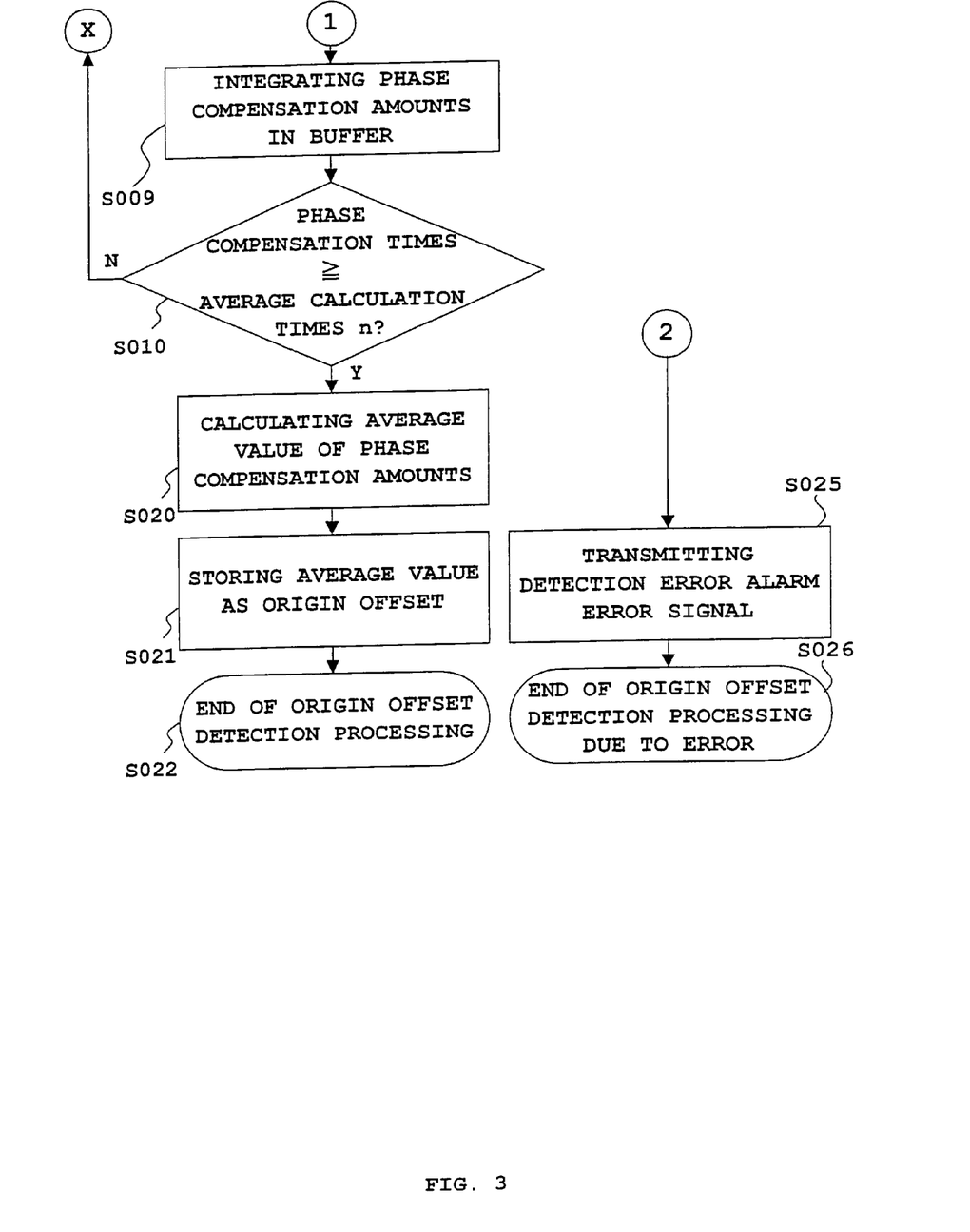
FIG. 3 is a flowchart subsequent to the flowchart of FIG. 2.

FIGS. 2 and 3 are flowcharts for explaining the origin offset calculation method of a rotational position-detecting device according to the first embodiment of this invention.

Figure 4:
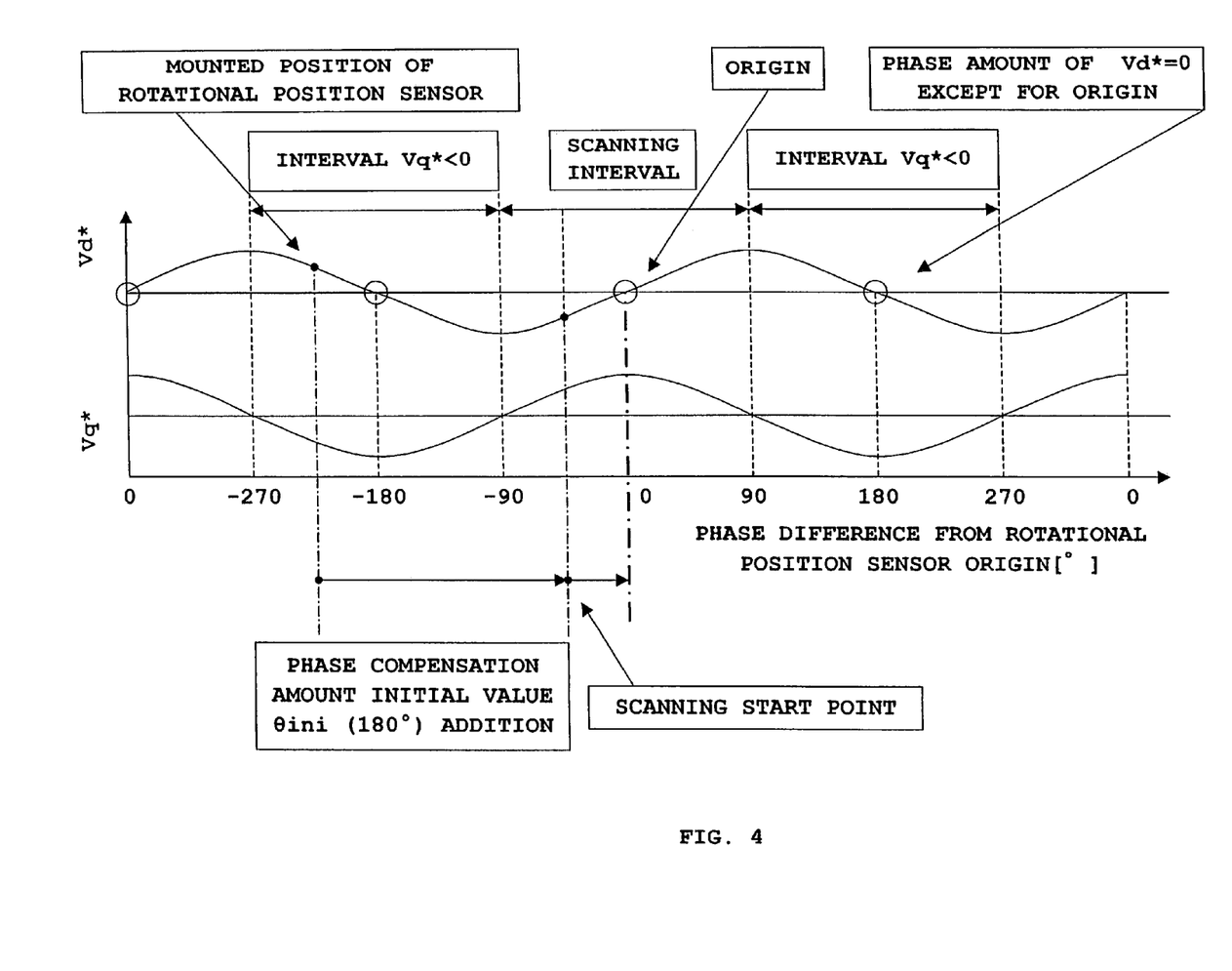
FIG. 4 is a phase explanatory chart explaining the relation between command values of a magnetic flux component voltage and a voltage of a component orthogonal to this magnetic flux component, and phases.

FIG. 4 is a chart showing the relation between a magnetic flux component voltage command value and a voltage command value of a component orthogonal to this component, and phases for explaining the origin offset calculation method according to the first embodiment of this invention.

With reference to FIG. 1, to a three-phase synchronous motor 1 (hereinafter referred to as electric motor) including a permanent magnet field or a winding field, a control device 2 to control the electric motor 1 is connected. A rotational position-detecting device 3 that is constructed of a resolver or a rotary encoder is mounted on a shaft of a rotor, not shown, of the electric motor 1. Outputs from the rotational position-detecting device 3 are inputted to a phase operator 4 that calculates positions of the rotor. A three-phase current of the electric motor 1 is detected with a current detector 5.

A three-phase to two-phase converter 6 makes coordinate transformation of three-phase currents $i_u$, $i_v$, $i_w$ into currents of d-axis and q-axis based on rotor position signals with a direction of a magnetic flux of a rotor being a d-axis, and a direction orthogonal to this direction being a q-axis. A current command generator 7 receives a torque command T* to generate such current command values of the mentioned d-axis and q-axis components that this T* and a torque, which the electric motor 1 generates, are in coincidence. A current control operator 8 operates a d-axis voltage command value $V_d^*$ and a voltage command value $V_q^*$ of a q-axis component from a deviation between a d-axis current command value $i_d^*$ and an actual current $i_d$, and a deviation between a q-axis current command value $i_q^*$ and an actual current $i_q$, respectively.

A two-phase to three-phase converter 9 makes coordinate transformation of $V_d^*$, and $V_q^*$, which the current control operator 8 outputs, into three-phase voltage command values $V_u^*$, $V_v^*$, $V_w^*$ based on rotor position signals. An inverter 10 converts an electric power of a DC power supply, not shown, into a thee-phase AC power based on three-phase voltage command values $V_u^*$, $V_v^*$, $V_w^*$, and supplies it to the electric motor 1.

A phase compensation amount operator 11 receives d-axis and q-axis voltage command values $V_d^*$, $V_q^*$, being outputs from the current control operator 8, and calculates a phase compensation amount, being a phase difference between a rotor reference position and an origin of a rotational position-detecting device (detail of operation is described later), and adds a phase compensation amount to an output of the phase operator 4. This phase compensation amount operator 11 comprises the following parts: That is, a phase compensation amount initial value operator 12 that calculates a phase compensation amount initial value $\theta_{ini}$ related to a rotor reference position from $V_q^*$; a proportional integral phase compensation amount operator 13 that obtains a proportional integral phase compensation amount $\theta_{pi}$ by multiplying a deviation between $V_d^*$ and zero by a proportional integral gain; a phase compensation amount initial value adder 14 that adds an output $\theta_{ini}$ from the phase compensation amount initial value operator 12 and an output $\theta_{pi}$ from the proportional integral phase compensation amount operator 13 to output a phase compensation amount; and a phase compensation amount adder 15 that adds an output from the phase operator 4 and a phase compensation amount, being an output from the phase compensation amount initial value adder 14.

The electric motor 1 further comprises a field winding drive 16 that excites a field winding, not shown.

Now, operations of each of the above-mentioned parts are described.

Arrangement of the other parts except for the phase compensation amount operator 11 is the same as the known vector control that is disclosed in the Japanese Patent Application No. 054472/2003.

A rotor position of the electric motor 1 is calculated with the rotational position detecting device 3 and the phase operator 4.

Based on the an output from the current detector 5 that detects a three-phase current of the electric motor 1 and the output from the phase operator 4, $i_d$ and $i_q$ are calculated by means of the three-phase to two-phase converter 6.

When the torque command T* is inputted to the current command generator 7, such $i_d^*$ and $i_q^*$ as to make a torque, which the electric motor 1 generates, coincident to the torque command value T* are outputted.

$V_d^*$ and $V_q^*$ are calculated with the current control operator 8 based on a deviation between $i_d^*$ and $i_d$, and a deviation between $i_q^*$ and $i_q$ so as to decrease these deviations.

Further, the coordinate transformation of $V_d^*$ and $V_q^*$ into three-phase voltage command values $V_u^*$, $V_v^*$, $V_w^*$ is made based on rotor position information, being an output from the mentioned phase operator 4, by means of the two-phase to three-phase converter 9. The inverter 10 controls outputs based on these three-phase voltage command values, and the electric motor 1 is controlled. In this manner, the vector control of the electric motor 1 is carried out.

However, in the case where there is a phase difference (i.e., an angle error is present) between a position where a rotational position-detecting device 3 that is mounted on the electric motor 1 and a rotor reference position, a rotor angle is detected in a shifted manner. When a rotational position of the rotor of the electric motor 1 is detected in a shifted manner, first the coordinate transformation of three-phase currents $i_u$, $i_v$, $i_w$ into d-axis component and q-axis component by means of the three-phase to two-phase converter 6 is not correctly performed. Moreover, the coordinate transformation of $V_d^*$, $V_q^*$ into a three-phase voltage by means of the two-phase to three-phase converter 9 is not correctly performed. Accordingly, a torque in accordance with a torque command value will not be outputted from the electric motor 1. Therefore, outputs from the phase operator 4 are compensated in the following manner.

Essential points of the rotational position compensation method exist in that a phase compensation amount $\theta$, with which $V_d^*$ is zero in the case where $i_d^*$ and $i_q^*$ are made to be zero, is obtained as an origin offset $\theta_{offset}$, and is added to an output from the phase operator 4.

The origin offset calculation method in order to make such compensation is now described with reference to the flowchart of FIG. 2.

When a rotational position compensation command A* is inputted in (Step S001), in case where the electric motor 1 is in rotation in (Step S002), a torque command T* is ignored to forcibly make $i_d^*$, $i_q^*$, being outputs from the current command generator 7, zero in (Step S003) (hereinafter referred to as the first process). Although a circuit functioning to forcibly make them zero is not shown, it is contained in an internal part of the current command generator 7.

Then, although not shown in the flowchart, a field winding is excited by the field winding drive 16 for generating a magnetic flux at the rotor, and the current control operator 8 automatically operates $V_d^*$, $V_q^*$ so that $i_d=i_q=0$ based on $i_d^*=i_q^*=0$, and outputs them (hereinafter referred to as the second process).

Supposing that $V_q^*>0$ in (Step S004), the phase compensation amount initial value operator 12 obtains a phase compensation amount initial value $\theta_{ini}$ from $V_q^*$ in (Step S005) (hereinafter referred to as the fifth process).

In (Step S006), the proportional integral phase compensation amount operator 13 multiplies a deviation between $V_d^*$ and zero by a proportional integral gain (that is, by the proportional integral operation, as long as inputs are not zero, outputs are increased overt time), and outputs a value having been obtained. The control is carried out using this value, so that phase angles are scanned as shown in FIG. 4 during this period. Then, at a time point of being converged, i.e., at the moment of the change being stopped, a proportional integral phase compensation amount $\theta_{pi}$ is obtained.

In (Step S007), the adder 14 adds a phase compensation amount initial value $\theta_{ini}$ and the above-mentioned proportional integral phase compensation amount $\theta_{pi}$ to obtain a phase compensation amount $\theta$ (hereinafter referred to as the sixth process).

$V_d^*$, $i_d$, $i_q$ are confirmed to be within a predetermined range in (Step S008), and $\theta$ having been obtained in (Step S007) is stored as being active (hereinafter referred to as the third process).

The adder 15 adds a phase compensation amount $\theta$ to an output from the phase operator 4 (hereinafter referred to as the fourth process).

it is also preferable that the foregoing fifth and the sixth processes are omitted as described later.

Each of the above-mentioned steps is described in further detail complementarily.

The calculation of an origin offset is executed when $V_d^*$ is not zero.

In (Step S004), a phase compensation amount initial value $\theta_{ini}$ is 0° in the case of $V_q^*$ being positive, and a phase compensation amount initial value $\theta_{ini}$ is 180° in the case of $V_q^*$ being negative.

With reference to FIG. 3, based on the fact that an origin offset is scanned from the phase compensation amount initial value $\theta_{ini}$ the scanning can be carried out within a range of −90° to +90° from an origin offset of the rotational position detecting device and the rotor of the electric motor.

A deviation between $V_d^*$ and zero is multiplied by a proportional integral gain to calculate a proportional integral phase compensation amount $\theta_{pi}$, and the mentioned phase compensation amount initial value $\theta_{ini}$ and proportional integral phase compensation amount $\theta_{pi}$ are added to obtain a phase compensation amount $\theta$.

The above-mentioned phase compensation amount θ is added to an output from the phase operator 4, and inputted to the three-phase to two-phase converter and the two-phase to three-phase converter.

In this manner, when $V_d^*$ is converged on zero, a phase compensation amount θ at this time is taken as an origin offset $θ_{Offset}$.

This origin offset θ is stored in storage means, not shown, and is used in the subsequent operations of the electric motor.

When each value of $V_d^*$, $i_d$, $i_q$ does not remain in a predetermined range capable of being ignored in (Step S008), it may be considered that an accurate origin offset cannot be obtained for some reason of, e.g., the mixing of noise. Then, the program returns to (Step S006) again to repeat each step (Step S013). When each value of $V_d^*$, $i_d$, $i_q$ remains in a predetermined ignorable range, the repetition is ended. However, when no convergence is obtained even after the number of times of repetition has exceeded a predetermined number of times (Step S013), the program proceeds to (Step S025) of FIG. 3 to transmit the alarm serving to notify detection error.

In such a control device of electric motor, a phase difference of rotational positions can be compensated with a phase compensation amount $θ_{ini}$ that is calculated from $V_q^*$ having been obtained in the control device, and a proportional integral phase compensation amount $θ_{pi}$ that is calculated by multiplying a deviation between $V_d^*$ and zero by a proportional integral gain so that $V_d^*$ may be zero.

Since each operation step as described above is implemented with software, the compensation of phase difference of rotational positions can be made just by a slight change of this software.

Embodiment 2

Although the calculation of an origin offset can be done as described above, it is preferable that the following processes as shown in a flowchart of FIG. 3 may be taken in order to achieve higher accuracy.

$θ_{Offset}$ when $V_d^*$ described in the foregoing first embodiment comes to be zero is obtained, and this $θ_{offset}$ is integrated into a buffer, not shown (Step S009). This process is repeated n times (Step S010). Then, n times of results are added up, and a value obtained by the addition is divided by n to obtain an average value (Step S020). This average value is stored (Step S021). Thereafter, a phase compensation command A* is made OFF to return to a normal vector control of an electric motor. At this time, the average $θ_{offset}$ having been obtained is stored in a storage device, not shown, and an origin is compensated using this stored value at the time of normal operation.

In this case, since an average value of origin offsets θ offset with which $V_d^*$ comes to be zero is calculated by the proportional integral operation of a deviation between $V_d^*$ and zero, this origin offset calculation method is unlikely to be affected by higher harmonics or noise as compared with the determination method of the instantaneous value of $V_d^*$ according to the conventional art, thus enabling to achieve improvement in accuracy.

Embodiment 3

Furthermore, higher accuracy can be achieved in the following manner. That is, in the case of presence of any detection error in the three-phase current detector, the detection error is outputted even if an actual current value is zero. Accordingly, current detected values $i_d$, $i_q$ that are obtained by the coordinate transformation with a three-phase to two-phase converter 6 will be values that periodically fluctuate.

Thus, even if the control is carried out so that the above-mentioned $i_d$, $i_q$ are compensated to be zero, voltage command values $V_d^*$, $V_q^*$ will not be zero, but values that periodically fluctuate. However, the mentioned $i_d$, $i_q$ will be zero by the calculation of an average value as in the foregoing second embodiment. Further, an advantage is performed such that a phase difference between a rotor reference position and an origin of a rotational position-detecting device can be compensated in the state that detection error of a current detector is canceled.

Furthermore, in the case of the presence of a large rotation change, likewise the mentioned detection currents $i_d$, $i_q$ fluctuate even after the coordinate transformation or the mentioned voltage command values $V_d^*$, $V_q^*$. In this case, a phase difference can be detected correctly by confirming that the fluctuation remains within a predetermined range.

According to the first to third embodiments, a phase compensation amount initial value $θ_{ini}$ is calculated from a voltage command value of a component orthogonal to a magnetic flux component; this phase compensation amount initial value $θ_{ini}$ is added to a proportional integral phase compensation amount $θ_{pi}$ that is calculated by multiplying a deviation between a magnetic flux component voltage and zero by a proportional integral gain to obtain a phase compensation amount; and these phase compensation amounts are averaged to obtain an origin offset. However, without such calculation of a phase compensation initial value $θ_{ini}$ and addition of a phase compensation amount initial value $θ_{ini}$ to a proportional integral phase compensation amount $θ_{pi}$, it is possible to calculate an origin offset only with a proportional integral phase compensation amount $θ_{pi}$.

Embodiment 4

The first embodiment shows an example in which an origin offset of a rotational position-detecting device is calculated by the d/q axis vector control. According to the fourth embodiment, a method of calculating an origin offset of a rotational position detecting device is described, supposing a system in which letting a vector sum of a d-axis component magnetic flux and a q-axis component magnetic flux a total flux $Φ_a$, and letting a total flux component γ-axis and a component orthogonal to a total flux component δ-axis. These two axes form total flux control axes, and an electric motor is controlled on the mentioned total flux control axes (hereinafter, it is referred to as an origin offset calculation method by total flux control).

Figure 5:
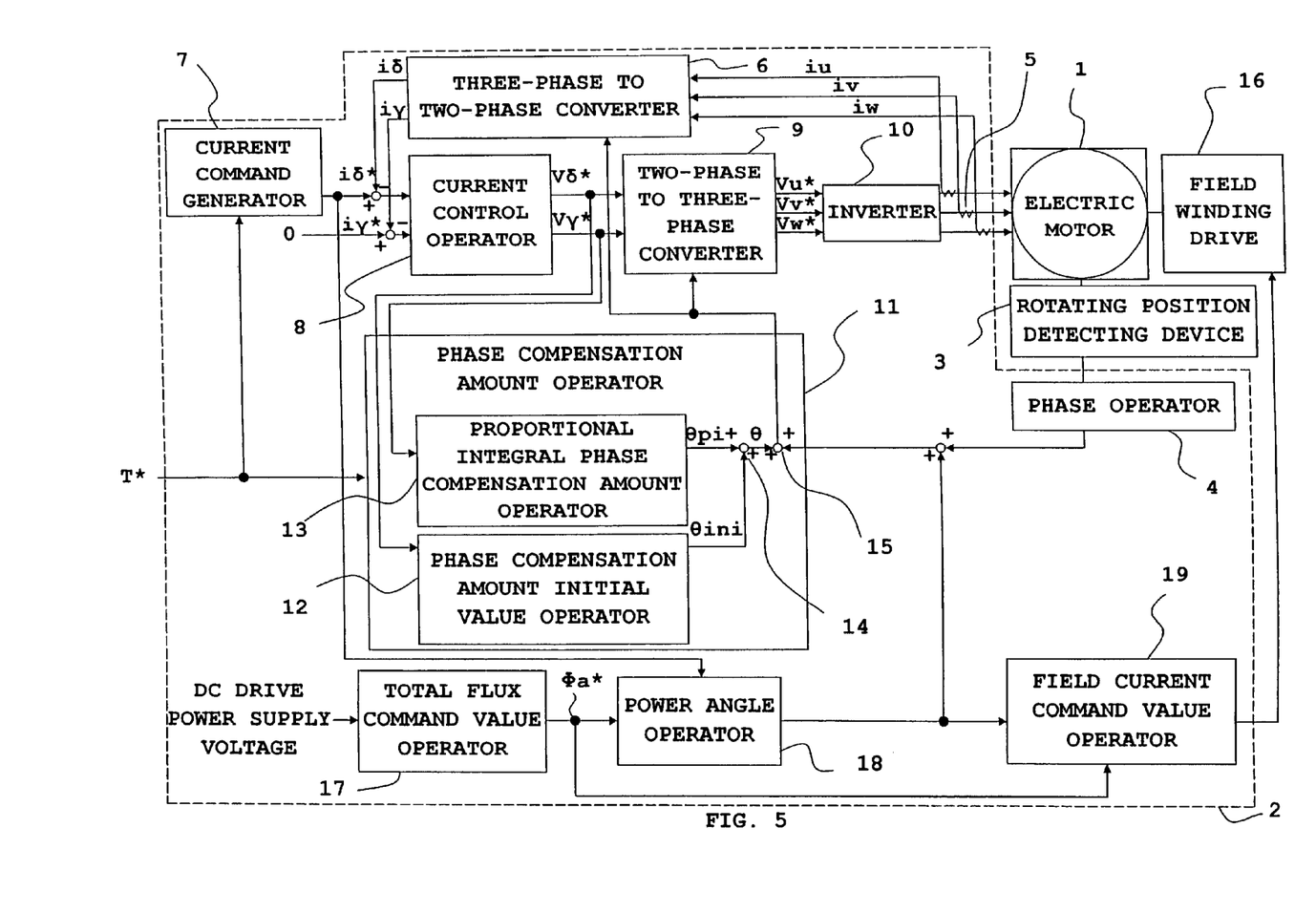
FIG. 5 is a block diagram of a control device of an electric motor according to a fourth embodiment.

FIG. 5 shows a block diagram of a motor control device executing the total flux control.

The motor control device of FIG. 5 comprises: a total flux command value operator 17 that operates an armature voltage command value from a DC drive power supply voltage, and operates such a total flux command value $Φ_a^*$ that a desired armature voltage command value is coincident to an armature voltage;

a power angle operator 18 that operates a power angle $η_a$, being an angle formed by a total flux $Φ_a$, based on the total flux command value $Φ_a^*$ and a δ-axis current; and a field current command value operator 19 that operates a field current command value with which a total flux equal to a total flux command value $Φ_a^*$ outputted form the total flux command value operator 17. The other parts are the same as those in the foregoing first embodiment, so that further detailed descriptions are omitted.

A total flux command value $\Phi_a^*$ is operated with the total flux command value operator 17 from a DC drive power supply voltage; a power angle $\eta_a$ is operated with the power angle operator 18 based on the mentioned total flux command value $\Phi_a^*$, and a field current command value if* is operated with the field current command operator 19; a field current value is adjusted with the field winding drive 16 so that the above-mentioned field current command value if* and field current value if are in coincidence; and the coordinate transformation to γδ-axes, letting a total flux component γ-axis and a component orthogonal to a total flux component δ-axis, is made by means of a three-phase to two-phase converter 6 based on a three-phase current value, a rotor position, and the power angle $\eta_a$.

Then a™ voltage command value $V_{TM}^*$ and a γ-axis voltage command value $V_©^*$ are calculated so that a δ-axis current command value that is calculated from the current command generator 7 and a δ-axis current that flows at δ-axis and a γ-axis current are zero.

Further, voltage command values Vγ*, Vδ* are converted into three-phase voltage command values $V_u^*$, $V_v^*$, $V_w^*$ based on the mentioned rotor position and power angle $\eta_a$ by means of a two-phase to three-phase converter.

In the control device of an electric motor that executes the total flux control of the electric motor in the mentioned manner, voltage equations at the above-mentioned γδ-axes will be expressed as follows:

$$V_\gamma = \omega \Phi_a \sin \alpha \quad (13)$$

$$V_\delta = Ri_\delta + \omega \Phi_a \cos \alpha \quad (14)$$

:where δ-axis current is $i_\delta$, R is one phase of resistance, and α is a phase difference of a rotational position detecting device with respect to a rotor reference position.

On the mentioned total flux control axes, when letting an angle formed by a total flux $\Phi_a$ and a d-axis a power angle $\eta_a$, $\eta_a$ will be expressed as follows:

[Equation 1]

$$\eta_a = \tan^{-1}\left|\frac{L_q i_\delta}{\Phi_a}\right| \quad (15)$$

:where Lq is a q-axis inductance. When δ-axis current $i_\delta$ is zero, γ, δ-axis voltages and a power angle $\eta_a$ will be expressed as follows:

[Equation 2]

$$V_\gamma = \omega \Phi_a \sin \alpha = \omega \phi_f \sin \alpha \quad (16)$$

$$V_q = \omega \Phi_a \cos \alpha = \omega \phi_f \cos \alpha \quad (17)$$

$$\eta_a = 0 \quad (18)$$

Since $\eta_a$ becomes zero and γ, δ-axes are in conformity with d, q-axes, γ-axis voltage command value is taken as a d-axis voltage command value, and δ-axis voltage command value is taken as a q-axis voltage command value. Thus, the same effect can be obtained by using the method shown in the foregoing first embodiment so that a γ-axis voltage command value may be zero.

Further, a proportional integral operator is used in order to calculate an origin offset according to the first and the second embodiments, the same effect can be obtained also with the use of a proportional operator or a proportional integral differential operator. Furthermore, although an example of an electric motor of winding field type is taken, the same effect can be obtained also in the case of an electric motor of permanent magnet field type.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An origin offset calculation method of a rotational position detecting device of an electric motor used in an electric motor control device that includes:
    a current detector that detects a three-phase current of a three-phase synchronous motor;
    a rotational position detecting device that detects a rotational position of said three-phase synchronous motor;
    a three-phase to two-phase converter that makes coordinate transformation of said three-phase current into a magnetic flux component and an orthogonal component orthogonal to said magnetic flux component based on said rotational position;
    a current command generator that divide a current command value, which is provided from outside, into a current command value of said magnetic flux component and a current command value of said orthogonal component;
    a current control operator that operates voltage command values of mentioned each component so that a current value of said magnetic flux component and a current value of said orthogonal component are equal to command values of said each component of said current command generator respectively;
    a two-phase to three-phase converter that makes the coordinate transformation of a voltage command value of said each component into a three-phase voltage command value; and
    an inverter that outputs a voltage to be applied to said three-phase synchronous motor based on an output from said two-phase to three-phase converter;
    the origin offset calculation method of a rotational position detecting device of an electric motor comprising:
    a first process of forcibly making a current command value of said each component zero;
    a second process of controlling offset to make the addition to an output from said rotational position detecting device so that said magnetic flux component voltage command value is zero by multiplying a deviation between said magnetic flux component voltage command value and zero by a predetermined proportional integral gain when said current command value becomes zero;
    a third process of letting said offset when said magnetic flux component voltage command value becomes zero a phase difference between said rotor reference position and an origin of said rotational position detecting device, and of storing this phase difference as an origin offset; and
    a fourth process of adding said origin offset to an output from said rotational position detecting device.

2. The origin offset calculation method of a rotational position detecting device of an electric motor according to claim 1, further comprising a fifth process of obtaining a phase compensation amount initial value from a voltage command value of a component orthogonal to said magnetic flux; and a sixth process of adding said phase compensation amount initial value to an output from said rotational position detecting device.

3. An origin offset calculation method of a rotational position-detecting device of an electric motor comprising:

a process of executing plural times the calculation method of an origin offset of a rotational position detecting device according to claim 1;

a process of averaging phase compensation amounts having been obtained plural times to obtain an origin offset average value; and a process of storing said origin offset average value.

4. The origin offset calculation method of a rotational position detecting device of an electric motor according to claim 3, wherein after a process of forcibly making a current command value of said each component zero, it is confirmed that a current value of said each component is not more than a predetermined level having preliminarily been determined, and thereafter a process of controlling offset to make an addition to an output from said rotational position detecting device is carried out so that said magnetic flux component voltage command value is zero by multiplying a deviation between said magnetic flux component voltage command value and zero by a predetermined proportional integral gain.

5. The origin offset calculation method of a rotational position detecting device of an electric motor according to claim 3, wherein after a process of forcibly making a current command value of said each component zero, it is confirmed that said magnetic flux component voltage command value remains within a predetermined range having preliminarily been determined, and thereafter a process of controlling offset to make an addition to an output from said rotational position detecting device is carried out so that said magnetic flux component voltage command value is zero by multiplying a deviation between said magnetic flux component voltage command value and zero by a predetermined proportional integral gain.

6. The origin offset calculation method of a rotational position detecting device of an electric motor according to claim 4, wherein when a current value or voltage command value of said component is not included in said predetermined range, the calculation processing of a phase compensation amount is executed again.

7. The origin offset calculation method of a rotational position detecting device of an electric motor according to claim 6, wherein when said origin offset calculation to be executed again is carried out not less than a predetermined number of times, a process of transmitting an alarm or alarm signal is carried out.

8. The origin offset calculation method of a rotational position detecting device of an electric motor according to claim 1, wherein said origin offset calculation method that is stared with the process of forcibly making a current command value of said each component zero, is started based on a phase compensation command signal transmitted from outside.

9. A motor control device comprising:

a current detector that detects a three-phase current of a three-phase synchronous motor;

a rotational position detecting device that detects a rotational position of said three-phase synchronous motor;

a three-phase to two-phase converter that makes the coordinate transformation of said three-phase current into a magnetic flux component and an orthogonal component orthogonal to said magnetic flux component based on said rotational position;

a current command generator that divide a current command value, which is provided from outside, into a current command value of said magnetic flux component and a current command value of said orthogonal component;

a current control operator that operates voltage command values of said each component so that current values of said each component are equal to command values of said each component of said current command generator respectively;

a two-phase to three-phase converter that makes the coordinate transformation of a voltage command value of said each component into a three-phase voltage command value;

an inverter that outputs a voltage to be applied to said three-phase synchronous motor based on an output from said two-phase to three-phase converter a zero input circuit that forcibly makes a current command value of said each component of control coordinate system zero in said control state;

a proportional integral phase compensation amount operator that controls offset to make addition to an output from said rotational position detecting device so that said magnetic flux component voltage command value is zero by multiplying a deviation between mentioned magnetic flux component voltage command value and zero by a predetermined proportional integral gain when mentioned current command value becomes zero;

a storage circuit that lets said offset when said magnetic flux component voltage command value becomes zero a phase difference between said rotor reference position and an origin of said rotational position detecting device, and stores this phase difference as an origin offset; and a compensation circuit that adds said origin offset to an output from said rotational position detecting device.

10. The motor control device according to claim 9, further comprising:

a total flux command value operator that operates an armature voltage command value from a DC drive power supply voltage, and outputs a total flux command value for obtaining this armature voltage;

a power angle operator that operates a power angle ($\eta_a$) based on said total flux command value and a current command value of a component ($\delta$) orthogonal to said magnetic flux component; and a field current command operator that controls a field winding current of said three-phase synchronous motor based on said total flux command value and said power angle.

* * * * *